(12) United States Patent
Horishita et al.

(10) Patent No.: US 8,559,814 B2
(45) Date of Patent: Oct. 15, 2013

(54) OPTICAL COMMUNICATION DEVICE AND POWER-SAVING CONTROL METHOD OF OPTICAL COMMUNICATION DEVICE

(75) Inventors: Masakazu Horishita, Kawasaki (JP); Toru Matsuyama, Kawasaki (JP)

(73) Assignee: Fujitsu Optical Components Limited, Kawasaki (JP)

( * ) Notice: Subject to any disclaimer, the term of this patent is extended or adjusted under 35 U.S.C. 154(b) by 83 days.

(21) Appl. No.: 13/328,666

(22) Filed: Dec. 16, 2011

(65) Prior Publication Data

US 2012/0087652 A1    Apr. 12, 2012

Related U.S. Application Data

(63) Continuation of application No. PCT/JP2009/060962, filed on Jun. 16, 2009.

(51) Int. Cl.
*H04B 10/08*   (2011.01)
(52) U.S. Cl.
USPC .................. 398/25; 398/30; 398/32; 398/33; 398/66
(58) Field of Classification Search
USPC ............. 398/25, 9, 38, 66, 67, 30, 32, 33, 58
See application file for complete search history.

(56) References Cited

U.S. PATENT DOCUMENTS

| | | | | |
|---|---|---|---|---|
| 5,504,606 | A * | 4/1996 | Frigo | 398/58 |
| 6,418,536 | B1 * | 7/2002 | Park | 713/323 |
| 7,441,061 | B2 * | 10/2008 | Gilligan | 710/300 |
| 7,536,489 | B2 * | 5/2009 | Oshikiri et al. | 710/58 |
| 7,734,173 | B2 * | 6/2010 | Gilligan | 398/16 |
| 8,005,362 | B2 * | 8/2011 | Sakamoto et al. | 398/67 |
| 8,159,963 | B2 * | 4/2012 | Fujita et al. | 370/252 |
| 8,171,312 | B2 * | 5/2012 | Nakamura | 713/300 |

(Continued)

FOREIGN PATENT DOCUMENTS

| | | |
|---|---|---|
| JP | 9-64894 | 3/1997 |
| JP | 2000-165368 | 6/2000 |

(Continued)

OTHER PUBLICATIONS

International Search Report for PCT/JP2009/060962 mailed Sep. 8, 2009.

(Continued)

*Primary Examiner* — Daniel Washburn
*Assistant Examiner* — Hibret Woldekidan
(74) *Attorney, Agent, or Firm* — Staas & Halsey LLP

(57) ABSTRACT

A power-saving mode flag generating unit 101e sets a power-saving mode flag to active (non power-saving mode, turning on the power-source) when it receives a reset signal from a MAC unit 102. Furthermore, the power-saving mode flag generating unit 101e sets the power-saving mode flag to sleep (power-saving mode, turning off the power source) in accordance with a signal-interrupt detection signal obtained by the signal-interrupt detecting unit 101f1 of the packet monitoring unit 101f. Depending on the state of a packet, the power-saving mode flag generating unit 101e changes the power-saving mode flag to active or sleep for the data communication area of the packet; however, for the ranging area of the packet, the power-saving mode flag generating unit 101e always sets the power-saving mode flag to active. A pattern discriminating unit 101g discriminates between the data communication area and the ranging area of the packet.

10 Claims, 19 Drawing Sheets

(56) References Cited

U.S. PATENT DOCUMENTS

| | | |
|---|---|---|
| 8,275,261 B2 * | 9/2012 | Mandin et al. ............... 398/72 |
| 2002/0055999 A1 * | 5/2002 | Takeda ........................ 709/224 |
| 2003/0202517 A1 * | 10/2003 | Kobayakawa et al. ..... 370/395.4 |
| 2004/0196869 A1 * | 10/2004 | Tsuchida et al. ............... 370/468 |
| 2004/0218556 A1 * | 11/2004 | Son et al. ..................... 370/311 |
| 2005/0008368 A1 * | 1/2005 | Zami et al. .................... 398/70 |
| 2006/0193631 A1 * | 8/2006 | Gilligan ....................... 398/58 |
| 2007/0092256 A1 | 4/2007 | Nozue et al. |
| 2009/0067356 A1 * | 3/2009 | Sakamoto et al. ............ 370/311 |
| 2009/0080889 A1 | 3/2009 | Nozue et al. |
| 2009/0110400 A1 | 4/2009 | Nozue et al. |
| 2009/0263127 A1 * | 10/2009 | Haran et al. .................. 398/38 |
| 2010/0008667 A1 | 1/2010 | Kim et al. |
| 2010/0260058 A1 | 10/2010 | Itano et al. |
| 2010/0316387 A1 * | 12/2010 | Suvakovic ..................... 398/98 |
| 2011/0208986 A1 * | 8/2011 | Soga ............................ 713/323 |
| 2011/0211837 A1 * | 9/2011 | Sugawa et al. ................ 398/67 |
| 2012/0128357 A1 * | 5/2012 | Mukai et al. .................. 398/58 |
| 2012/0301145 A1 * | 11/2012 | Kozaki et al. ................. 398/58 |
| 2013/0045005 A1 * | 2/2013 | Nakura et al. ................. 398/25 |
| 2013/0176848 A1 * | 7/2013 | Jinzaki ........................ 370/230.1 |

FOREIGN PATENT DOCUMENTS

| | | |
|---|---|---|
| JP | 2004-104278 | 4/2004 |
| JP | 2006-211480 | 8/2006 |
| JP | 2007-43270 | 2/2007 |
| WO | WO 2008/038981 A1 | 4/2008 |
| WO | 2009/072356 A1 | 6/2009 |

OTHER PUBLICATIONS

Japanese Office Action mailed Jan. 8, 2013, issued in corresponding Japanese Patent Application No. 2011-519344.

* cited by examiner

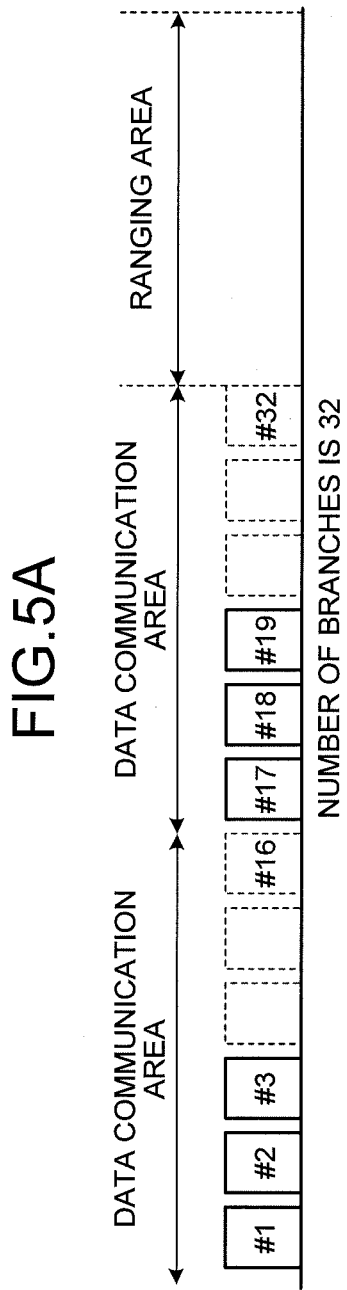

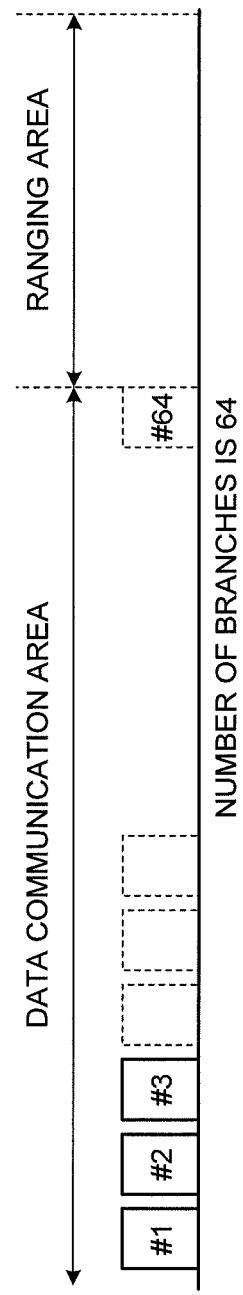

OPTICAL COMMUNICATION DEVICE AND POWER-SAVING CONTROL METHOD OF OPTICAL COMMUNICATION DEVICE

CROSS-REFERENCE TO RELATED APPLICATION

This application is a continuation of International Application No. PCT/JP2009/060962, filed on Jun. 16, 2009, the entire contents of which are incorporated herein by reference.

FIELD

The embodiments discussed herein are directed to an optical communication device and a power-saving control method of the optical communication device.

BACKGROUND

For computer communication using optical networking, an optical fiber network includes an Optical Line Terminal (OLT) device, which is a terminating device of a carrier, and an Optical Network Terminal (ONT) device (also called an Optical Network Unit (ONU)), which is a terminating device of an end-user (a telecommunication subscriber). A splitting device called a star coupler is installed in the optical fiber network. The star coupler distributes light from a single input to multiple outputs. A single optical fiber of the OLT is branched and connected to a plurality of ONTs. Such a communication system is called a Passive Optical Network (PON). The PON is also called a Passive Double Star (PDS).

In the conventional technology of communication systems that include a terminating device, there is a disclosed communication device that recognizes, by using the header section of a received packet, that the packet is not received via a communication from a different communication device and recognizes that the packet contains a control signal for turning on/off the power source of the communication device so as to recognize the details of control to be performed on the communication device by using the control signal.

In another conventional technology, there is a disclosed communication system in which frame packet signals that each include a packet overhead section and frame synchronization information for establishing frame synchronization corresponding to the transmission speeds of slave communication devices are located within a single packet signal length or within a single packet time period in a divided manner and the frame packet signals are transmitted from a master communication device to the slave communication devices in a frame period interval.

In this conventional technology, the slave communication device receives, from the frame packet signals that are divided within a single packet signal length or within a single packet time period, a frame packet signal that conforms to the transmission speed of the slave communication device and reads the frame synchronization information so as to establish frame synchronization.

Patent Document 1: Japanese Laid-open Patent Publication No. 09-064894
Patent Document 2: Japanese Laid-open Patent Publication No. 2000-165368

In a communication network that includes a communication device as a terminating device, the communication device usually needs to have the power source turned on all the time so as to stand by for communication even when the communication device is in an idling state where communication is not performed. A master communication device, such as the above-described OLT, consumes a large amount of power because the master communication device has to perform communication with a plurality of slave communication devices, such as the above-described ONTs, in synchronization.

In terms of saving of energy, the problem is how to reduce the power consumption while the master communication device is in operation. Because the above-described conventional technologies are not designed from the perspective of saving energy, it is difficult to reduce the power consumption of the communication device.

SUMMARY

According to an aspect of an embodiment of the invention, a carrier-side optical communication device that is connected to a plurality of subscriber-side optical communication devices and that performs two-way communication with the subscriber-side optical communication devices in an optical communication system, the carrier-side optical communication device including a packet monitoring unit that monitors the presence or absence of a packet that is transmitted from the subscriber-side optical communication devices; a power-saving mode flag generating unit that generates a power-saving mode flag for the carrier-side optical communication device in accordance with the presence or absence of the packet that is monitored by the packet monitoring unit; and a power-saving control unit that controls saving of power of the carrier-side optical communication device in accordance with the power-saving mode flag generated by the power-saving mode flag generating unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 5A is a diagram that illustrates the packet structure in accordance with the number of branches that is conventionally used;

FIG. 5B is a diagram that illustrates the packet structure in accordance with the number of branches that is used nowadays;

DESCRIPTION OF EMBODIMENTS

Preferred embodiments of the present invention will be explained with reference to accompanying drawings. In the following embodiments, an explanation is given of, for example, a PON system. The discussed technical idea is applied to, not only a PON system, but also to a wide range of optical communication systems. That is, the discussed technology is not limited to the following embodiments. Prior to an explanation of the embodiments, the outline of a PON system is explained as background technology.

Outline of PON System

Figure 1:
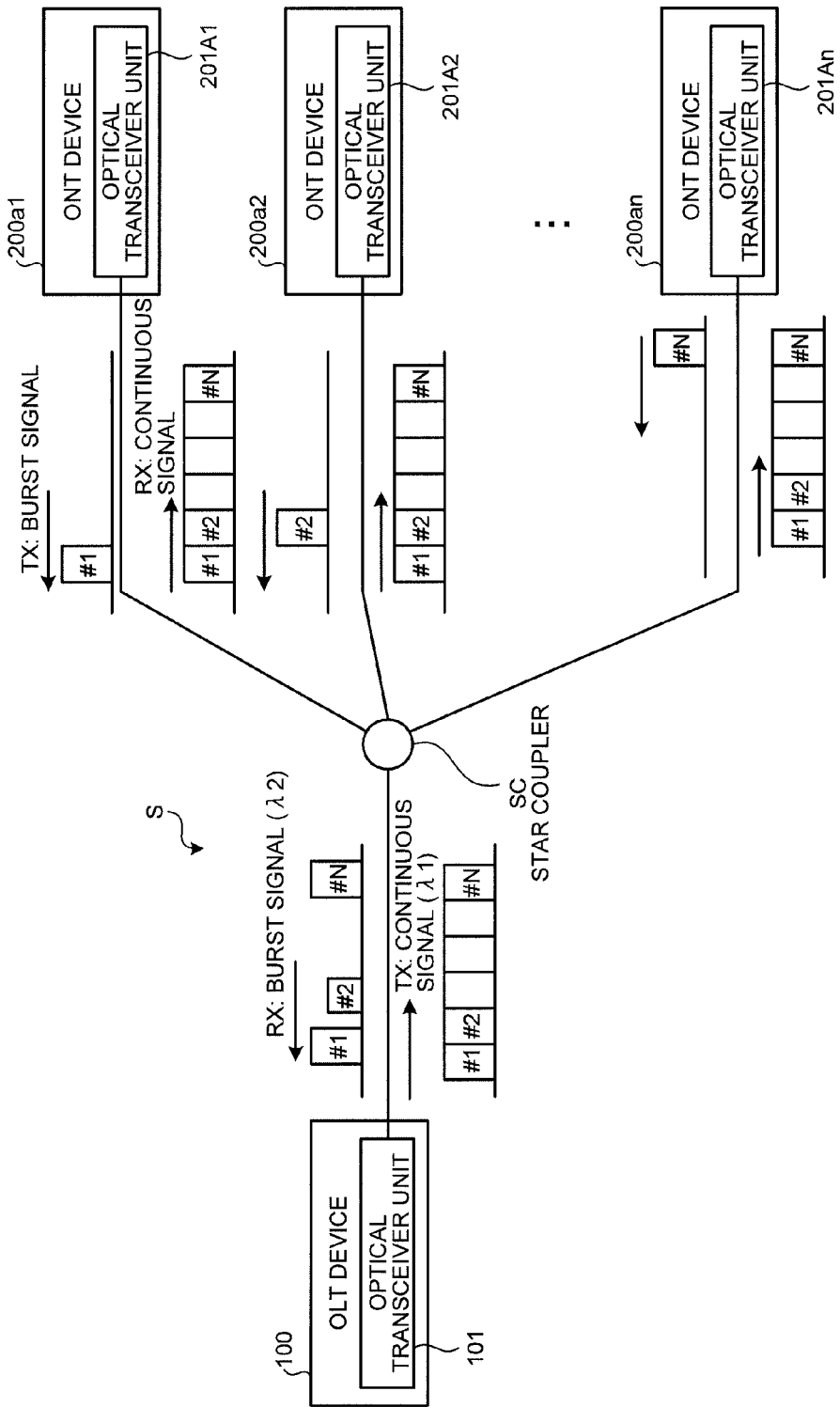
FIG. 1 is a block diagram that illustrates the configuration of a PON system.

FIG. 1 is a block diagram that illustrates the configuration of a PON system. As illustrated in this figure, in a PON system S, a single OLT device 100 is connected to a plurality of ONT devices 200$ai$ (i=1, 2, ..., n) via a star coupler SC such that they perform two-way communication with each other. The OLT device 100 is a terminating device of a carrier, and the ONT device 200$ai$ is a terminating device of a user. The OLT device 100 transmits, to the ONT device 200$ai$ via the star coupler SC, a λ1-band continuous signal that is a downstream signal. Each of the ONT devices 200$ai$ receives the continuous signal from the OLT device 100.

Furthermore, each of the ONT devices 200$ai$ transmits, to the OLT device 100 via the star coupler SC, a λ2-band burst signal that is an upstream signal. During communication using a λ2-band burst signal, the transmission range and the loss along the transmission path vary in accordance with the installation condition of each of the ONT devices 200$ai$. For this reason, the OLT device 100 performs time-division multiplexing control so that the burst signals output from the ONT devices 200$ai$ do not collide with one another.

As illustrated in FIG. 1, an optical transceiver unit 101 of the OLT device 100 performs an optical communication with an optical transceiver unit 201Ai of the ONT device 200$ai$. The optical transceiver unit 101 and the optical transceiver unit 201Ai are modules that are controlled by Media Access Control Large Scale Integration (MAC LSI) for optical communication.

Because the transmission distance to each of the connected ONT devices 200$ai$ is different in the PON system S, communication delay measurement is conducted in order to perform communication between the OLT and the ONT when an end-user becomes a subscriber and has a line installed. The communication delay measurement is called "ranging" and is a function controlled by the MAC LSI that is usually installed in the OLT device 100.

Outline of Ranging Process

Figure 2:
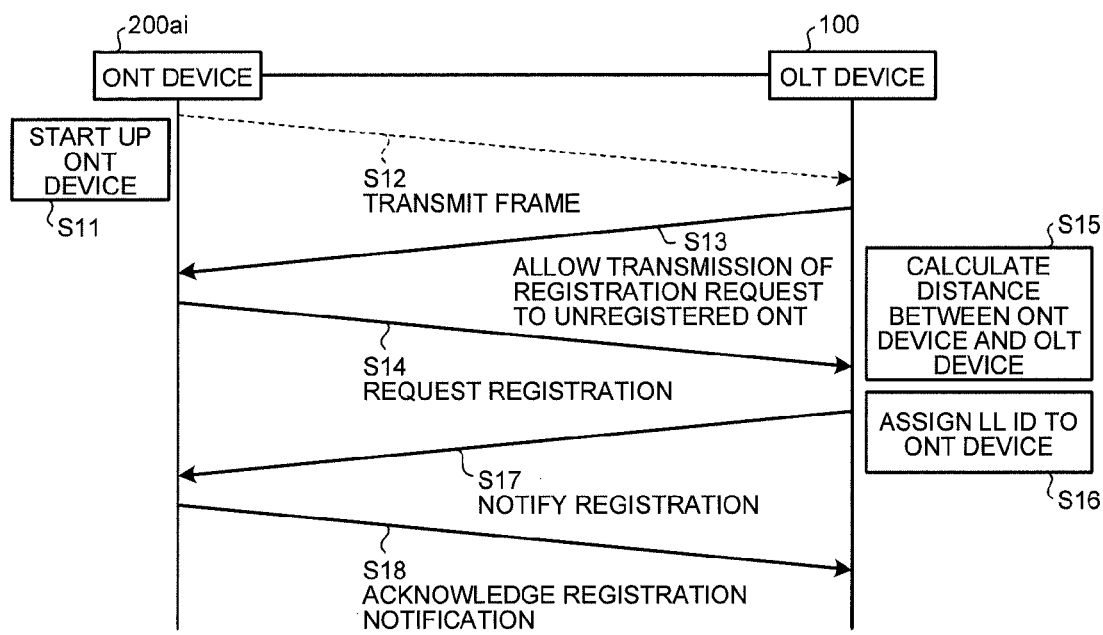
FIG. 2 is a sequence diagram that illustrates the steps of a ranging process.

FIG. 2 is a sequence diagram that illustrates the steps of a ranging process. First, at Step S11, the ONT device 200$ai$ is started up. At Step S12, the ONT device 200$ai$ transmits, to the OLT device 100, a frame signal for frame synchronization with the OLT device 100.

At Step S13, after receiving the frame signal from the ONT device 200$ai$, the OLT device 100 transmits, to the unregistered ONT device 200$ai$, a signal that allows transmission of a request for registration in the OLT device 100. At Step S14, the ONT device 200$ai$ transmits, to the OLT device 100, a registration request to register the ONT device 200$ai$ in the OLT device 100.

At Step S15, the OLT device 100 calculates the distance between the OLT device 100 and the ONT device 200$ai$ by using the time from when the signal that allows transmission of the registration request is transmitted to the ONT device 200$ai$ at Step S13 to when the registration request is received from the ONT device 200$ai$ at Step S14.

At Step S16, the OLT device 100 assigns a Logical Link ID (LL ID) to the ONT device 200$ai$ that has transmitted the registration request received at Step S14. The LL ID is an ID that uniquely identifies each of the ONT devices 200$ai$ in the PON system S.

At Step S17, the OLT device 100 transmits, to the ONT device 200$ai$ that has transmitted the registration request at Step S14, a registration notification that includes the LL ID assigned at Step S16. At Step S18, the ONT device 200$ai$, which has received the registration notification at Step S17, transmits to the OLT device 100 a registration notification acknowledgement that indicates the reception of the registration notification. When the OLT device 100 receives the registration notification acknowledgement, a sequence of the registration process for the ONT device 200$ai$ is completed.

Frame Structure and Packet Structure of Upstream Signal

Figure 3:
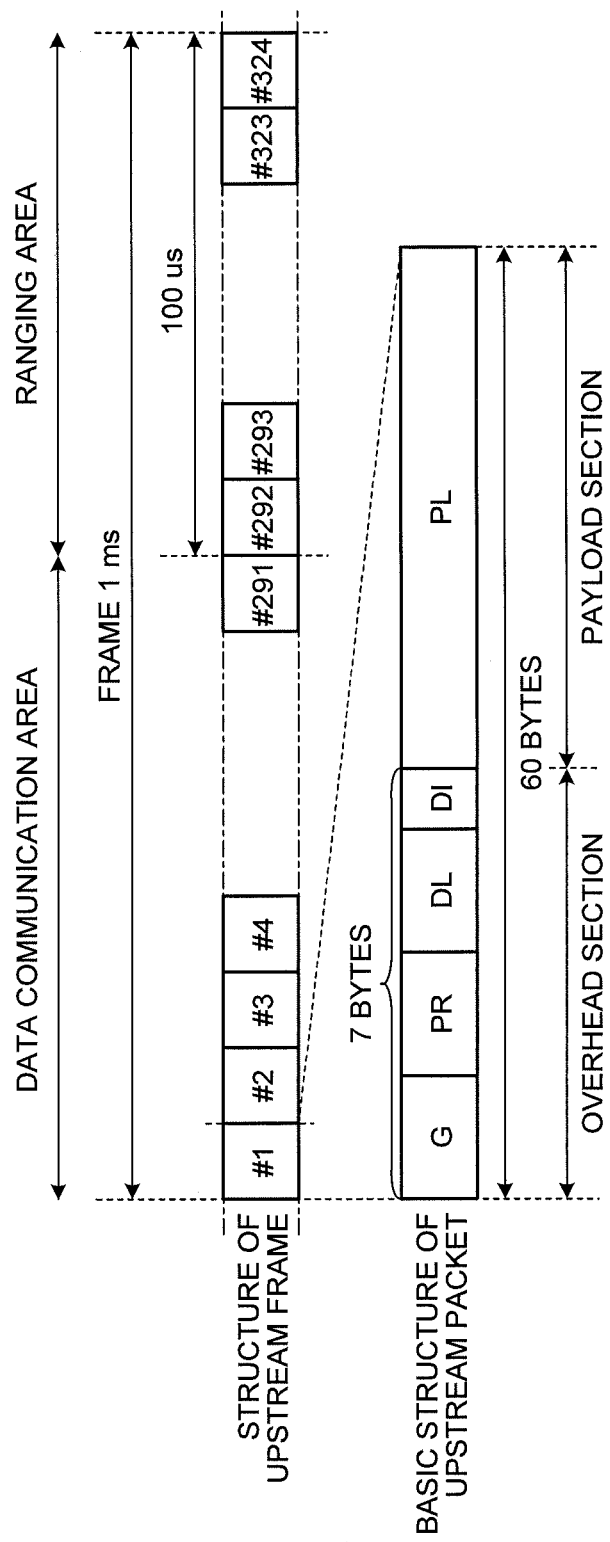
FIG. 3 is a diagram that illustrates the frame structure and the packet structure of an upstream signal sent from an ONT device to an OLT device.

FIG. 3 is a diagram that illustrates the frame structure and the packet structure of an upstream signal sent from the ONT device 200ai to the OLT device 100. The upstream signal frame has a frame length with a transmission time of, for example, 1 [ms (millisecond)]. The upstream signal frame includes a data communication area for transmitting a packet from each end-user and includes a ranging area that is used during ranging. Furthermore, each packet included in the data communication area has a packet length of 60 bytes and includes an overhead section and a payload section. A packet included in the data communication area is also called a PDS cell.

The overhead section includes information for indentifying a packet, and the payload section includes user data. The overhead section, which has 7 bytes in total, includes "G", "PR", "DL", and "DI", as illustrated in FIG. 3. "G" is a guard interval and is a redundant section that is added in order to prevent interference between packets. "PR" is a preamble and includes a signal that makes the OLT device 100 aware of the start of transmission of an upstream packet and that notifies the synchronization timing. "DL" is a delimiter and is information that indicates the start position of a packet. "DI" is a data identifier and is identification information that indicates the type of packet.

The ranging area has a frame length with a transmission time of, for example, 100 [us (microsecond)]. when a delay measurement instruction is issued from the OLT device 100, the ranging area includes one PDS-OAM (operation administration and maintenance) packet that is called a delay measurement window and is for each of the ONT devices 200ai. Ranging is performed at this ranging area, and a delay time is measured from the time difference between the timing when a signal that allows the transmission of a registration request is transmitted from the OLT device 100 to each of the ONT devices 200ai and the timing when a registration request, which is a packet for ranging, is received from the ONT device 200ai.

Electric Power Saving of PON System

Because the OLT device 100 in the PON system S contains a huge number of end-users, the overall system consumes an extremely large amount of power. Therefore, there is a need to save electric power in the PON system S and other optical access systems. Saving electric power and maintaining the functionality of the system at the same time become a problem.

The ONT device 200ai may easily save power by using a combination of well-known technologies. Because each of the ONT devices 200ai in the PON system S is independent and because the ONT device 200ai transmits a burst signal to the OLT device 100, the ONT device 200ai enters a sleep mode (power-saving mode), during which the circuit block is off, at times other than during the transmission time, so it is easy to reduce power consumption.

Figure 4:
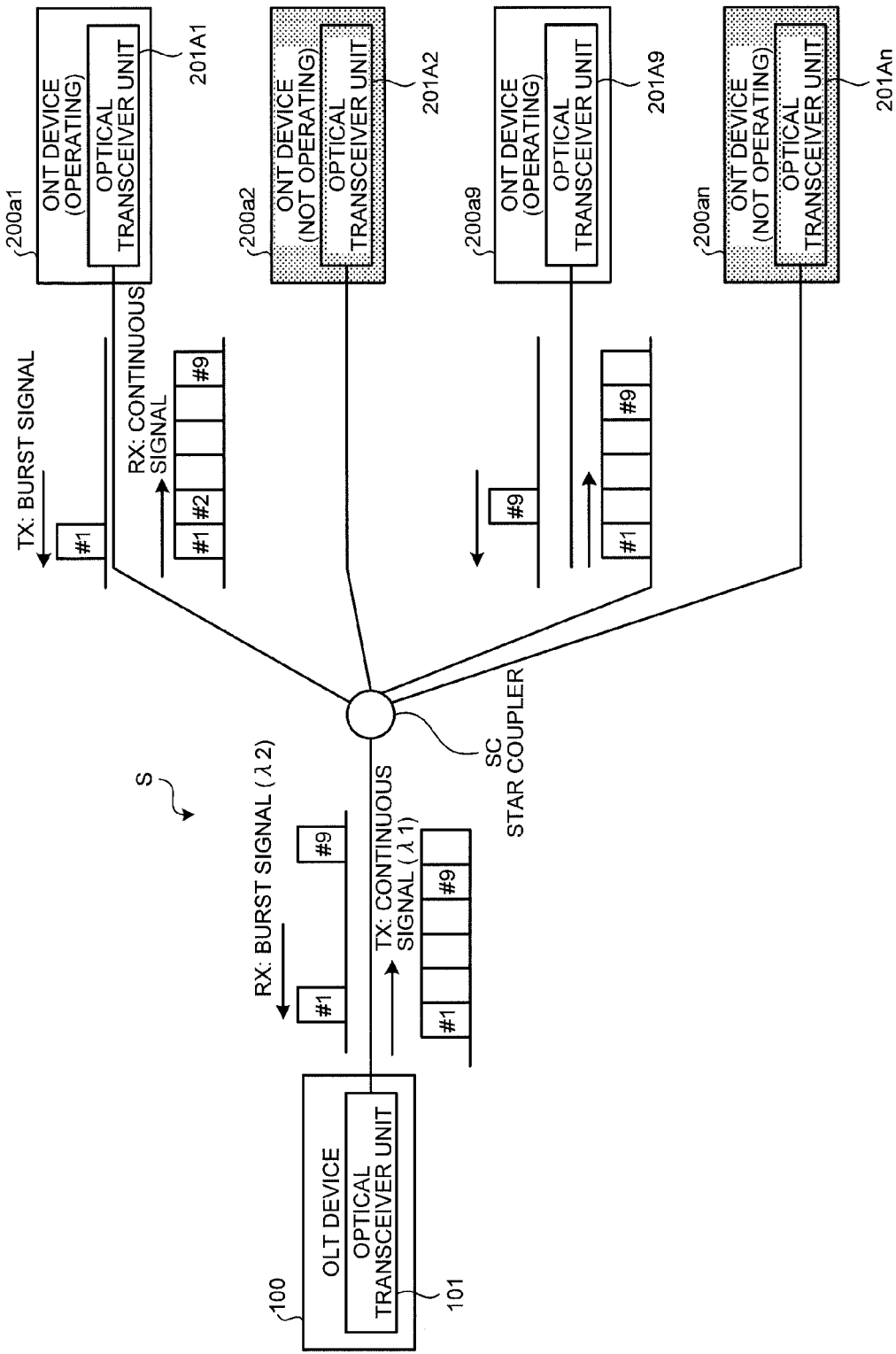
FIG. 4 is a diagram that illustrates a sparse installation state where, out of a plurality of ONT devices, a few ONT devices are operating and many ONT devices are not operating.

At the beginning of the start of a service, the number of operating ONT devices 200ai is low, and the OLT device 100 receives a low amount of data. As illustrated in FIG. 4, such a state is called a sparse installation state where, out of the plurality of ONT devices 200ai, a few ONT devices 200ai are operating and many ONT devices 200ai are not operating.

In the case of the sparse installation state, the power source of the OLT device 100 is turned off by using ranging information from the above-described MAC LSI, so it is possible to easily save power. As illustrated in FIG. 5A, conventionally, the number of branches of the star coupler SC is mainly 16 or 32. Therefore, even when a sleep mode may be set in the sparse installation state, the ratio of the sleep-mode time to the number of the delay measurement window at the ranging area is low. Specifically, even when the sleep-mode time may be ensured, the total sleep-mode time ensured is short because of the low number of delay measurement windows. Thus, there are few advantages of being changed to the sleep mode when a burst signal is received.

Nowadays, it is possible to increase the number of branches by using the star coupler SC in accordance with ITUT-984.2 Class C/C+. As illustrated in FIG. 5B, when the number of branches is large, the number of delay measurement windows at the ranging area becomes large, which results in a longer sleep-mode time being ensured in total. Thus, there is an expected advantage in that the electric power of the OLT device 100 is saved while it is idling.

For example, when the electric power of the OLT device 100 is saved in the sparse installation state, a possible method for saving power in the sparse installation state is to control the OLT device 100 so as to switch between an active mode (non power-saving mode) and a sleep mode by using the periodicity of packet sending timing information in the delay measurement window that is obtained by using the ranging information from the MAC LSI.

Configuration of OLT Device

Figure 6:
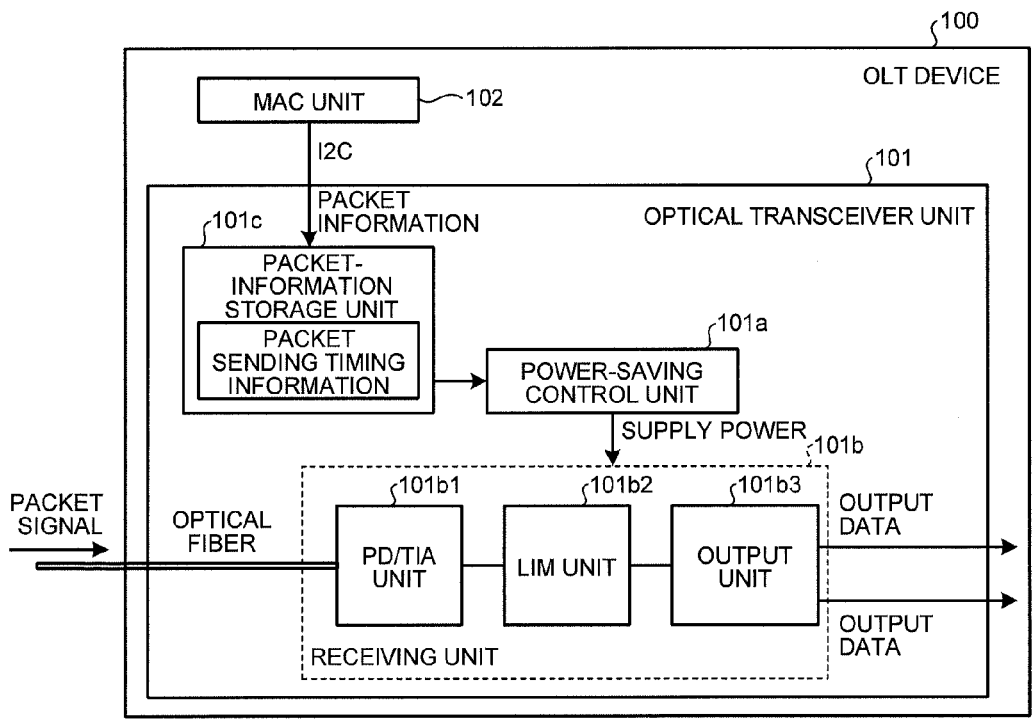
FIG. 6 is a block diagram that illustrates the configuration of the OLT device.

FIG. 6 is a block diagram that illustrates the configuration of the OLT device 100. The OLT device 100 includes the optical transceiver unit 101 and a MAC unit 102, which is MAC LSI. The MAC unit 102 controls the PON system S. The MAC unit 102 identifies, for example, a plurality of ONT devices 200ai and, in order to perform communication between the OLT device 100 and the ONT devices 200ai, conducts delay measurement of packet transmission during the installation of a line to each of the ONT devices 200ai.

As described above, the delay measurement is conducted by using a common function, called ranging, of the OLT device 100. Because of the delay measurement, packet sending timing information (hereafter, sometimes referred to as ranging information) may be acquired from each of the ONT devices 200ai. The packet sending timing information is information that defines the timing at which a packet is transmitted to the ONT device 200ai, allowing for a periodic delay time that is obtained by conducting the delay measurement.

The optical transceiver unit 101 includes a power-saving control unit 101a, a receiving unit 101b, and a packet-information storage unit 101c. The packet-information storage unit 101c obtains periodic packet sending timing information from the above-described packet sending timing information and stores therein the obtained packet sending timing information. A periodic power-saving mode flag (a flag for identifying an active mode and a sleep mode) is generated from the stored sending timing information and is output to the power-saving control unit 101a. The optical transceiver unit 101 obtains, from the MAC unit 102, packet sending timing information via low-speed serial communication of an I2C (Inter-Integrated Circuit, SFP standard: 100 kbps).

The power-saving control unit 101a controls the power source of the receiving unit 101b of the optical transceiver unit 101 in accordance with a periodic power-saving mode flag that is input from the packet-information storage unit 101c. Thus, the power source of the receiving unit 101b is off in an idling state when there are no packets received or transmitted so that it is possible to save power.

The receiving unit 101b includes a Photo Diode (PD)/Trans Impedance amplifier (TIA) unit 101b1, a Limiter amplifier (LIM) unit 101b2, and an output unit 101b3. The PD/TIA unit 101b1 uses a photoelectric conversion element PD to convert an optical signal of a packet into an electric signal. The PD/TIA unit 101b1 uses a current-voltage conversion element TIA to convert the current of the electric signal into a voltage and amplifies the voltage. The PD/TIA unit 101b1 outputs the amplified voltage signal to the LIM unit 101b2.

The LIM unit 101b2 removes excessive input and amplification noise from the voltage signal, which is input from the PD/TIA unit 101b1, and outputs the signal to the output unit 101b3. The output unit 101b3 demultiplexes the frame in which packets from the ONT devices 200ai are multiplexed so as to obtain the packet for each of the ONT devices 200ai and then sends each packet to, for example, an Ethernet (registered trademark) network.

Figure 7:
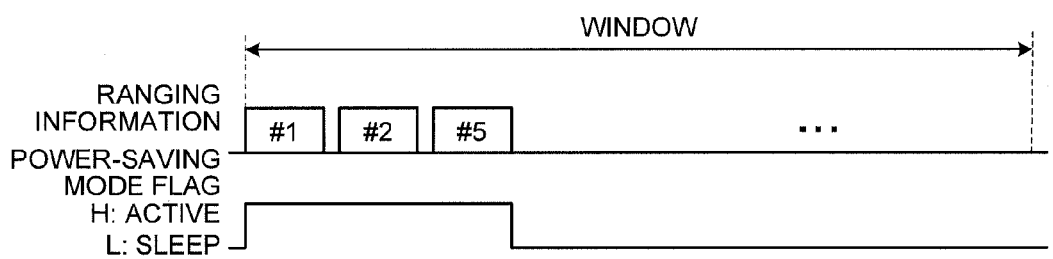
FIG. 7 is a diagram that illustrates the outline of ranging information that is contained in a delay measurement window and has a fixed periodicity.

When the OLT device 100 is configured as described above, ranging information having a fixed periodicity is contained in the delay measurement window, as illustrated in FIG. 7. This ranging information is not changed after being stored once in the packet-information storage unit 101c. Therefore, a power-saving mode flag (H: active mode, L: sleep mode) having a fixed periodicity is generated on the basis of the fixed ranging information. Specifically, as long as the ranging information is not changed, it is possible to control the saving of the power of the receiving unit 101b by using the static power-saving mode flag that has a fixed periodicity.

Problem of Above-Described Configuration

Figure 8:
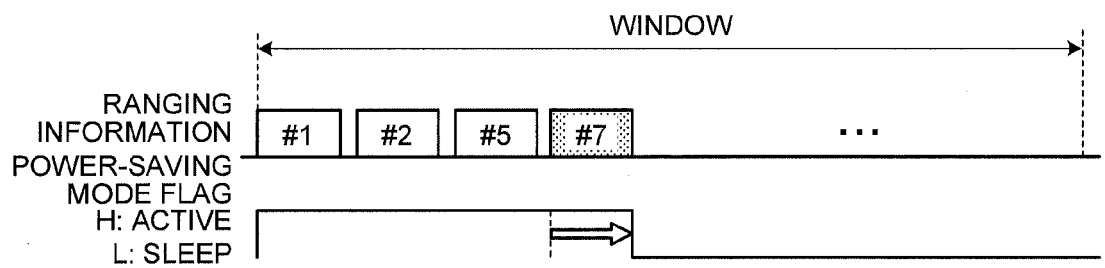
FIG. 8 is a diagram that illustrates an outline in which, when the number of end-users is dynamically increased, the ranging information is increased and the periodicity of the ranging information is changed.
Figure 9:
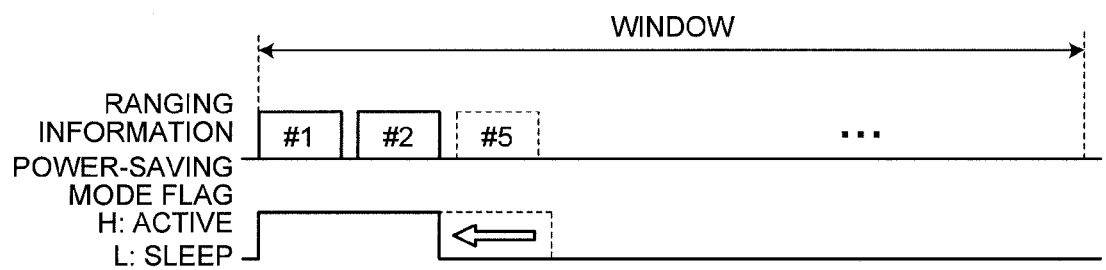
FIG. 9 is a diagram that illustrates an outline in which, when the number of end-users is dynamically decreased, the ranging information is decreased and the periodicity of the ranging information is changed.

With the configuration of the OLT device 100, as described above, if the number of end-users is dynamically increased or decreased, the ranging information is also increased or decreased, which results in a change in the periodicity of the ranging information. Accordingly, as illustrated in FIGS. 8 and 9, it is preferable to change the periodicity of the power-saving mode flag. Specifically, when the number of ONT devices 200ai is increased, the period during which the power-saving mode flag is set to "H" needs to be extended corresponding to the increase (the ranging information of #7). Furthermore, when the number of ONT devices 200ai is decreased, the period during which the power-saving mode flag is set to "H" needs to be shortened corresponding to the decrease (the ranging information of #5).

Figure 10:
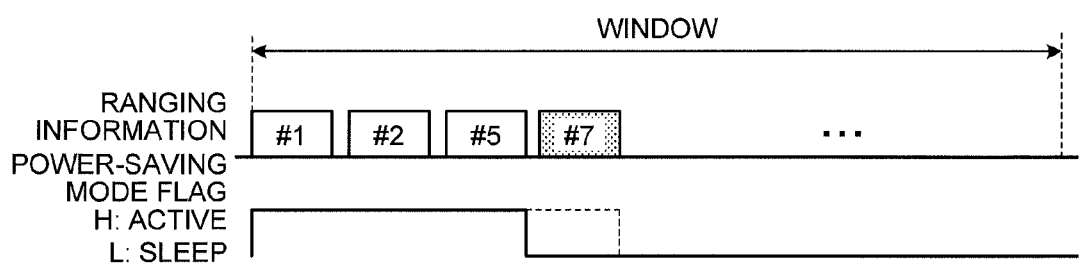
FIG. 10 is a diagram that illustrates an outline in which the periodicity of the static power-saving mode flag fails, which results in a mismatch between the ranging information and the state of the power-saving mode flag.

Because the ranging information is stored in the packet-information storage unit 101c in a fixed manner, the periodicity of the ranging information is not changed. Specifically, as illustrated in FIG. 10, the periodicity of the static power-saving mode flag fails, which results in a mismatch between the ranging information and the state of the power-saving mode flag. Usually, when an ONT device 200ai is added, corresponding ranging information is entered just after the previous ranging information. For example, as illustrated in FIG. 8, when the ranging information of #7 is added after the ranging information of #5, the ranging information of #7 is set after the ranging information of #5 without any space for the ranging information of #6 interposed therebetween.

To solve the above problem, it is possible that, for example, the periodic packet sending timing information is not stored in the optical transceiver unit 101, and the packet sending timing information received from the MAC unit 102 is directly used, i.e., the ranging information is updated for each packet. Because the low-speed I2C communication system is used between the MAC unit 102 and the optical transceiver unit 101, it is impossible to follow an increase and decrease in the ranging information in real time.

Figure 11:
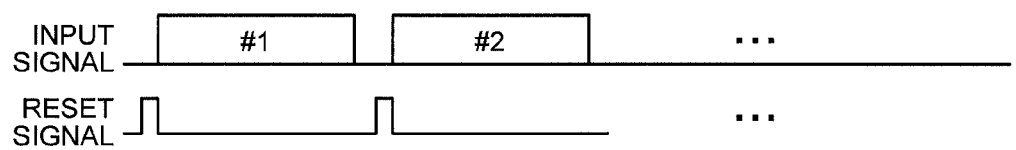
FIG. 11 is a diagram that illustrates the outline of an exemplary configuration in which a reset signal input from a MAC unit 102 to an optical transceiver unit 101 is used.
Figure 12:
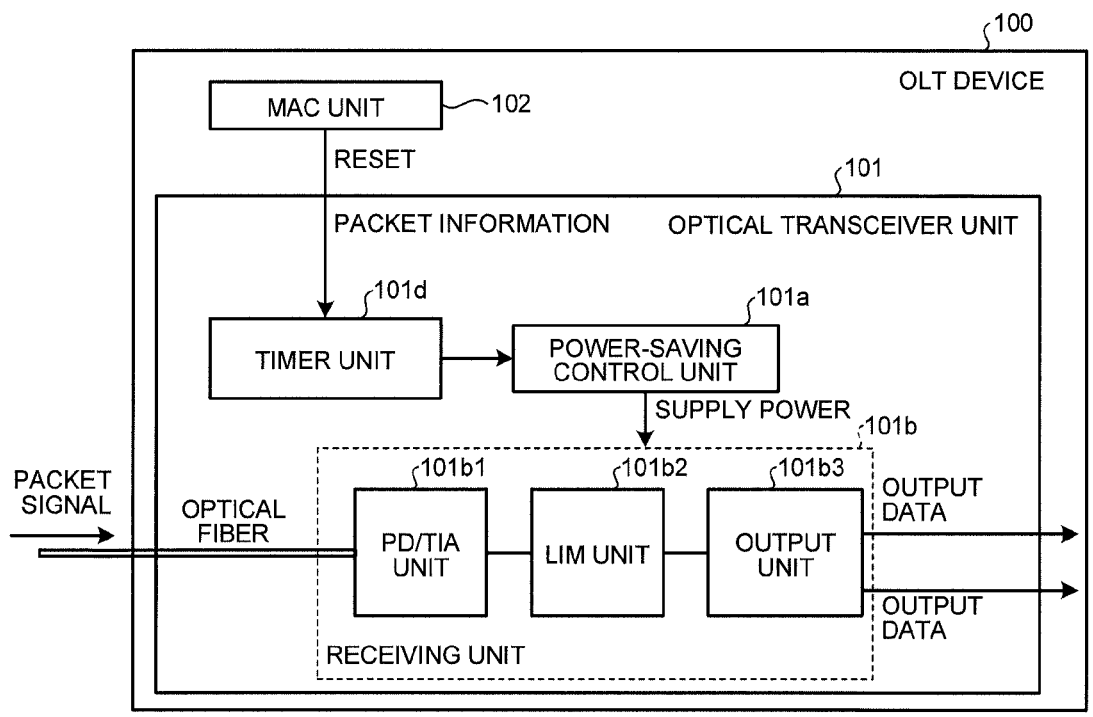
FIG. 12 is a diagram that illustrates an exemplary configuration for turning the power source on or off by using a reset signal and a timer unit that has a timer function.

Furthermore, in order to solve the above-described problem, as illustrated in FIG. 11, it is possible to use a reset signal that is input from the MAC unit 102 to the optical transceiver unit 101 in order to initialize the auto threshold control (ATC) of the optical transceiver unit 101, or the like, just before a packet is input. For example, as illustrated in FIG. 12, a configuration may be used to turn the power source on/off by using a reset signal and a timer unit 101d that has a timer function.

As described above, a frame is divided into a data area and a ranging area, as illustrated in FIG. 3. Because a data packet is input to a data communication area just after resetting, there is no problem when the power source of the receiving unit 101b is turned off when there is no resetting. Conversely, because the timing with which a packet for ranging is sent for the ranging area is not known, the power source of the receiving unit 101b needs to be always on. With the configuration of the OLT device 100 illustrated in FIG. 12, there is a possibility that the power source is turned off during ranging and therefore a packet may not be detected during the ranging.

Figure 13:
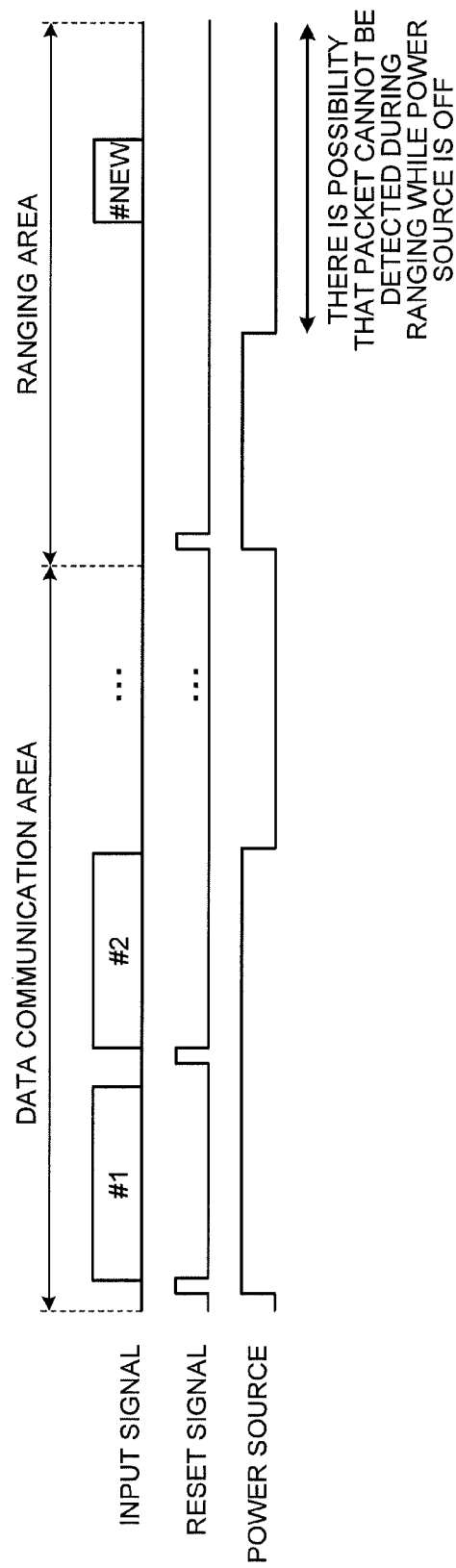
FIG. 13 is a timing chart for the timer unit to turn off the power source of a receiving unit.

Specifically, as illustrated in the timing chart of FIG. 13, the timer unit 101d measures a predetermined time after a reset signal is input and, when another reset signal is not input during the predetermined time, the power-saving control unit 101a turns off the power source of the receiving unit 101b. As described above, the timing with which the ranging packet is sent for the ranging area is not known. Therefore, as illustrated in FIG. 13, when the power source of the receiving unit 101b has already been turned off when the ranging packet of "#New" is sent, there is a disadvantage in that the ranging packet may not be detected.

According to the technology discussed in the following embodiment, it is possible to follow an increase and decrease in the number of packets of the ONT devices 200ai in real time, and to perform power-saving control that may be applied to the time during ranging that is specific to the PON system S.

A detailed explanation is given below of an embodiment according to the discussed technology. In the following, an explanation is given by using, for example, the PON system S as an optical communication system. Explanations are omitted for the functional blocks to which the same reference numerals are assigned as those explained in the above-described background and problems.

Configuration of OLT Device According to the Embodiment

Figure 14:
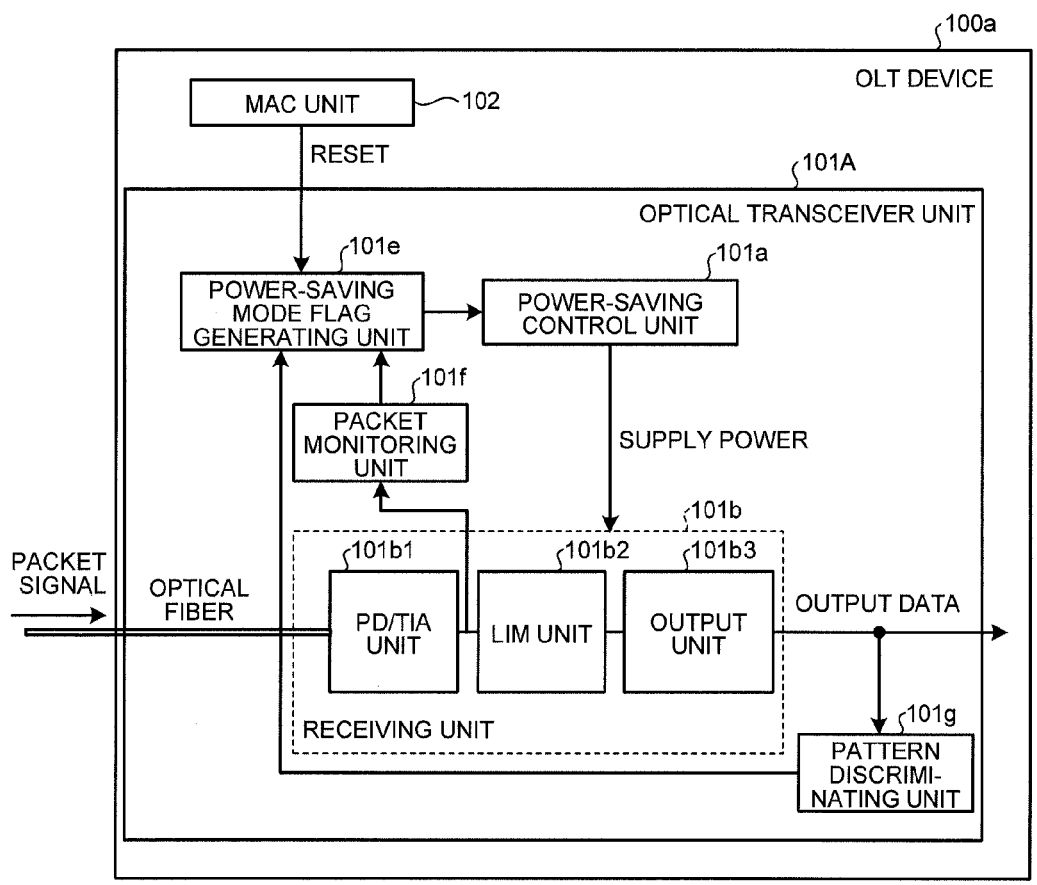
FIG. 14 is a block diagram that illustrates the configuration of an OLT device according to an embodiment.

FIG. 14 is a block diagram that illustrates the configuration of an OLT device 100a according to the embodiment. The OLT device 100a includes an optical transceiver unit 101A and the MAC unit 102. The optical transceiver unit 101A includes the power-saving control unit 101a, the receiving unit 101b, a power-saving mode flag generating unit 101e, a packet monitoring unit 101f, and a pattern discriminating unit 101g.

The power-saving control unit 101a controls saving of the power of the receiving unit 101b of the OLT device 100a by using a power-saving mode flag generated by the power-saving mode flag generating unit 101e. The power-saving mode flag generating unit 101e generates a power-saving mode flag by using the packet sending timing information acquired by the packet monitoring unit 101f and the reset signal output from the MAC unit 102. The packet monitoring unit 101f monitors a packet transmitted from each of the ONT devices 200*ai*. The pattern discriminating unit 101*g* discriminates between a packet for the data communication area and a packet for the ranging area and then outputs the result of the discrimination to the power-saving mode flag generating unit 101*e*.

Figure 18:
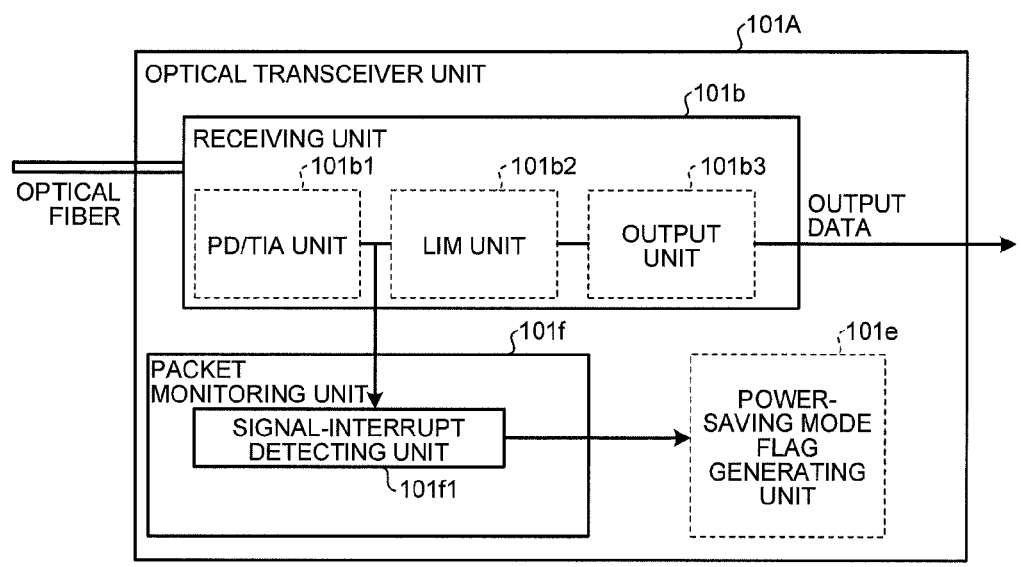
FIG. 18 is a diagram that illustrates an optical transceiver unit that includes a packet monitoring unit.

The packet monitoring unit 101*f* monitors a packet that is transmitted from the ONT device 200*ai*. As illustrated in FIG. 18, the packet monitoring unit 101*f* includes a signal-interrupt detecting unit 101*f*1. When receiving a reset signal from the MAC unit 102, the power-saving mode flag generating unit 101*e* sets the power-saving mode flag to active (a non power-saving mode, turning on the power-source).

The power-saving mode flag generating unit 101*e* sets the power-saving mode flag to sleep (a power-saving mode, turning off the power source) by using a signal-interrupt detection signal that is obtained by the signal-interrupt detecting unit 101*f*1 of the packet monitoring unit 101*f*.

Although the power-saving mode flag generating unit 101*e* changes the power-saving mode flag so as to be active or sleep depending on the packet state for the data communication area of the packet, the power-saving mode flag generating unit 101*e* always sets the power-saving mode flag to be active for the ranging area.

The pattern discriminating unit 101*g* discriminates between the data communication area of a packet and the ranging area. Here, by using the fact that the head pattern of the packet during the normal communication is different from the head pattern of the packet during the ranging, the pattern of a packet is compared with a pattern that is pre-stored in a predetermined storage area (not illustrated) for reference so that the patterns are discriminated. The power-saving control unit 101*a* turns the power source of the receiving unit 101*b* on or off by using the power-saving mode flag.

The above-described functional blocks are used to turn on or off the power source of the receiving unit 101*b* (which may be a part of the circuit blocks instead of all of the circuit blocks) of the optical transceiver unit 101A depending on the state of the packet so that the electric power may be saved. Furthermore, the power source of the receiving unit 101*b* is always on without regard to the state of the packet during the ranging so that the ranging may be correctly performed.

Figure 15:
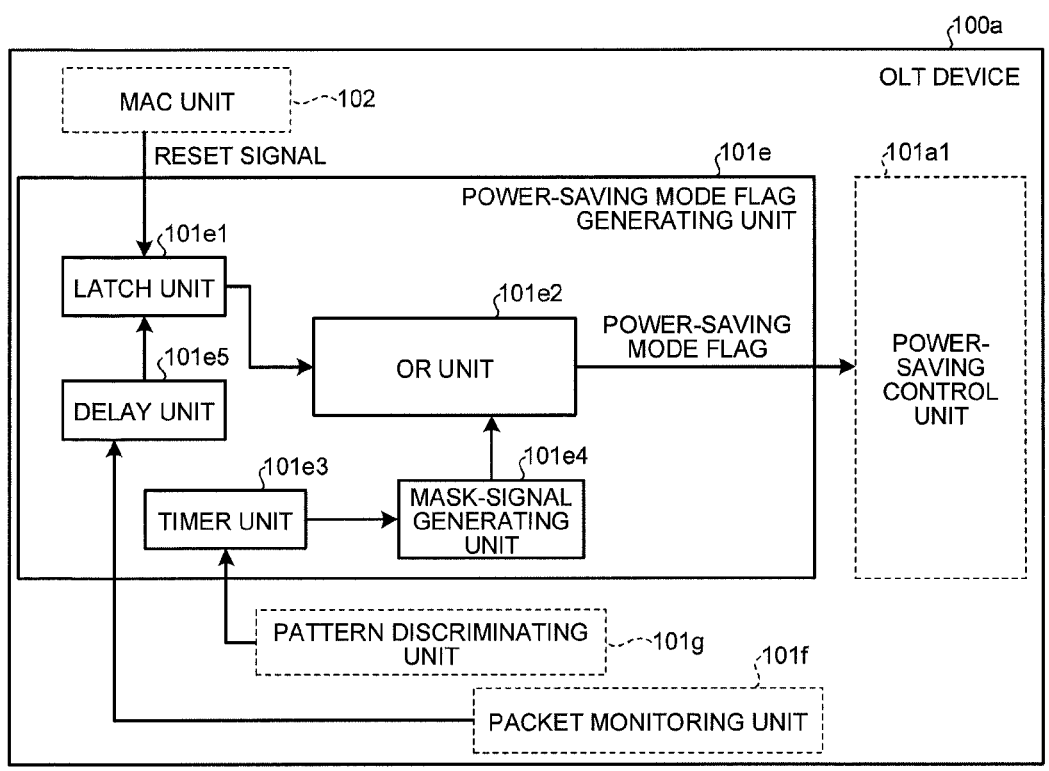
FIG. 15 is a diagram that illustrates the detailed configuration of a power-saving mode flag generating unit.

Detailed Configuration of Power-Saving Mode Flag Generating Unit According to the Embodiment FIG. 15 is a diagram that illustrates the detailed configuration of the power-saving mode flag generating unit 101*e*. The power-saving mode flag generating unit 101*e* includes a latch unit 101*e*1, an OR unit 101*e*2, a timer unit 101*e*3, a mask-signal generating unit 101*e*4, and a delay unit 101*e*5.

The latch unit 101*e*1 receives a reset signal from the MAC unit 102. The reset signal is a control signal that is generally used in the OLT device 100*a*. The reset signal is generated just before each packet by using the ranging information in order to initialize a threshold for the optical transceiver unit 101A, or the like. The latch unit 101*e*1 has a function of detecting a reset signal, latching (storing) it, and being reset by a signal-interrupt detection signal input from the delay unit 101*e*5. The latch unit 101*e*1 outputs, to the OR unit 101*e*2, a value H (on) or L (off) of the reset signal.

The delay unit 101*e*5 delays the signal-interrupt detection signal obtained from the packet monitoring unit 101*f* until a predetermined condition is satisfied. The predetermined condition will be explained in detail later. The timer unit 101*e*3 measures the time from when input of a detection signal for detecting a first packet signal at the data communication area of the delay measurement window, which is discriminated by the pattern discriminating unit 101*g*, is received until when the pre-set ranging area is received.

After finishing measuring the time until the pre-set ranging area is received, the timer unit 101*e*3 outputs a measurement finish signal to the mask-signal generating unit 101*e*4. By using the measurement finish signal input from the timer unit 101*e*3, the mask-signal generating unit 101*e*4 generates a mask signal that is set to H (on) during the ranging and to L (off) at times other than during the ranging. The mask-signal generating unit 101*e*4 outputs the mask signal to the OR unit 101*e*2.

The OR unit 101*e*2 is a logical gate that performs a logical addition of the reset signal input from the latch unit 101*e*1 and the mask signal input from the mask-signal generating unit 101*e*4. The OR unit 101*e*2 outputs, to a power-saving control unit 101*a*1, the result of the logical addition of the reset signal and the mask signal as a power-saving mode flag. The signal output from the OR unit 101*e*2 is a power-saving mode flag. Although the power-saving mode flag is changed to an active mode or a sleep mode depending on the packet state for the data communication area, the power-saving mode flag is always set to the active mode for the ranging area.

Exemplary Circuit of Delay Unit

Figure 16A:
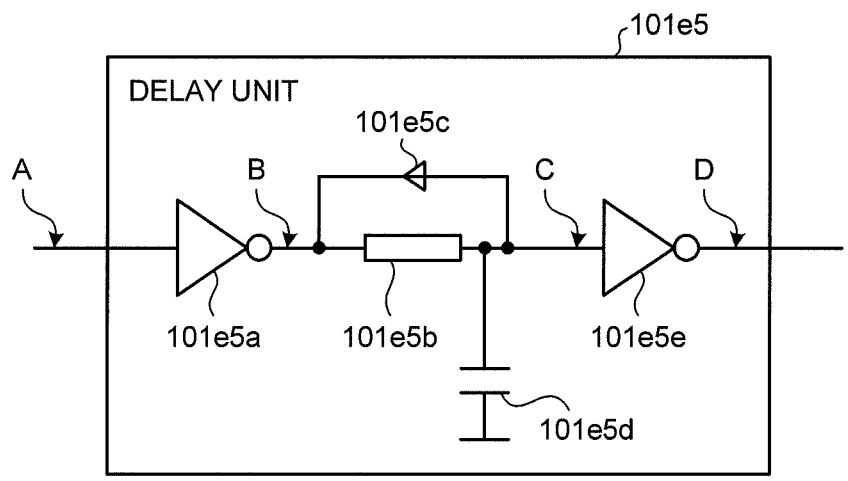
FIG. 16A is a diagram that illustrates an exemplary circuit of a delay unit.

FIG. 16A is a diagram that illustrates an exemplary circuit of the delay unit 101*e*5. The delay unit 101*e*5 includes an inverting gate 101*e*5*a*, a resistor 101*e*5*b*, a diode 101*e*5*c*, a capacitor 101*e*5*d*, and an inverting gate 101*e*5*e*. The inverting gate 101*e*5*a* inverts a signal-interrupt detection signal input from the packet monitoring unit 101*f* and then outputs the inverted signal to the resistor 101*e*5*b*. The resistor 101*e*5*b* is first connected to the grounded capacitor to which a signal is output from the resistor 101*e*5*b*. Then, the resistor 101*e*5*b* is connected to the diode (commutator) 101*e*5*c* that inputs, to the resistor 101*e*5*b*, a signal output from the resistor 101*e*5*b* in a loop-back manner. Finally, the resistor 101*e*5*b* is connected to the inverting gate 101*e*5*e* that inverts the signal output from the resistor 101*e*5*b* and outputs the inverted signal to the latch unit 101*e*1.

Timing Chart of Delay Unit

Figure 16B:
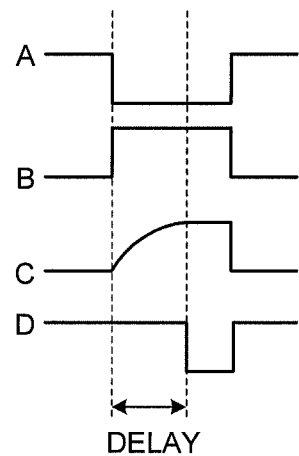
FIG. 16B is a timing chart that indicates the state of a signal at each point in the circuit of the delay unit.

FIG. 16B is a timing chart that illustrates the states of signals at the points A to D in the circuit of the delay unit 101*e*5 illustrated in FIG. 16A. The capacitor value of the capacitor 101*e*5*d* is adjusted so that the amount of delay may be changed. The falling edge of an output signal is delayed, and the rising edge of the signal is not delayed. It is preferable that the delay time is approximately a guard time (25 to 30 ns in GPON).

As illustrated in FIG. 16B, the signal at A is a signal-interrupt detection signal. The signal at B is a signal that is obtained by inverting the signal-interrupt detection signal. The signal at the point C has an edge that is gradually rising because the voltage drop across the resistor 101*e*5*b* is gradually negated due to the charging of the capacitor 101*e*5*d*. The signal at the point D is an inverted signal of the signal at the point C and is output for the first time after the signal at the point C is set to H (on). The time from when the signal-interrupt detection signal is input to when the signal at the point C is set to H (on) is a delay time that is delayed by the delay unit 101*e*5.

The above-described predetermined condition that defines the time during which the signal-interrupt detection signal obtained from the packet monitoring unit 101*f* is delayed is the completion of charging of the capacitor 101*e*5*d*.

Exemplary Circuit of Latch Unit

Figure 17:
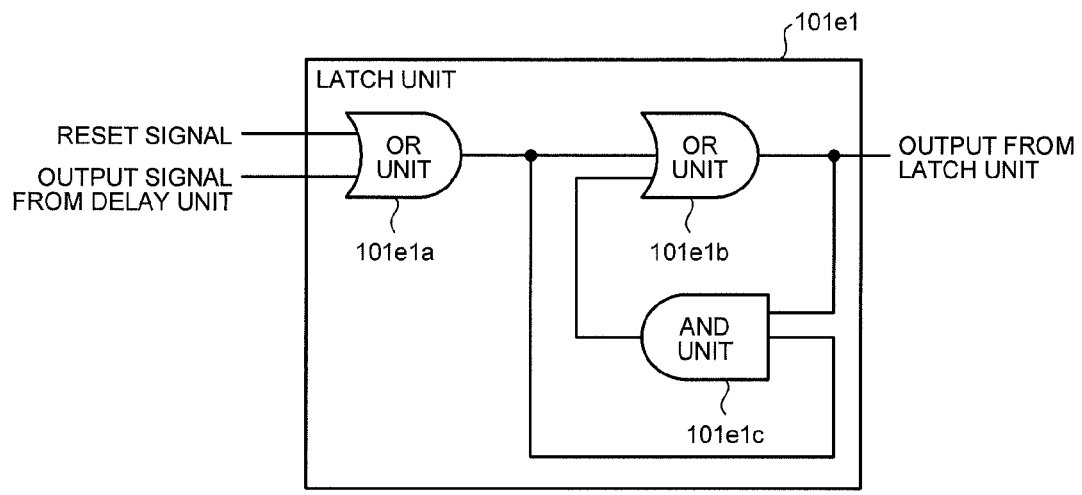
FIG. 17 is a diagram that illustrates an exemplary circuit of the latch unit.

FIG. 17 is a diagram that illustrates an exemplary circuit of the latch unit 101*e*1. The latch unit 101*e*1 detects the input of a reset signal from the MAC unit 102, latches it, and resets the latching of the reset signal in accordance with the input of a signal output from the delay unit 101*e*5.

The latch unit 101*e*1 includes an OR unit 101*e*1*a*, an OR unit 101*e*1*b*, and an AND unit 101*e*1*c*. The OR unit 101*e*1*a* outputs, to the OR unit 101*e*1*b* and the AND unit 101*e*1*c*, the logical addition of the input of the reset signal from the MAC unit 102 and the input of the output signal from a delay unit 101*e*5. The OR unit 101*e*1*b* outputs, to the OR unit 101*e*2 of the power-saving mode flag generating unit 101*e* and to the AND unit 101*e*1*c*, the logical addition of the outputs from the OR unit 101*e*1*a* and the AND unit 101*e*1*c*.

The AND unit 101*e*1*c* outputs, to the OR unit 101*e*1*b*, the logical multiplication of the outputs from the OR unit 101*e*1*a* and the OR unit 101*e*1*b*. With the above-described configuration, as long as any one of the reset signal and the output from the delay unit 101*e*5 is H (on), the latch unit 101*e*1 stores its state and outputs it.

FIG. 18 is a diagram that illustrates the optical transceiver unit 101A that includes the packet monitoring unit 101*f*. The packet monitoring unit 101*f* includes the signal-interrupt detecting unit 101*f*1. The signal-interrupt detecting unit 101*f*1 receives the input of a packet signal that is output from the PD/TIA unit 101*b*1 of the receiving unit 101*b* and is indicated by a voltage. The signal-interrupt detecting unit 101*f*1 detects the presence or absence of the input of a packet signal and notifies it of the power-saving mode flag generating unit 101*e*.

Explanatory Circuit of Signal-Interrupt Detecting Unit

Figure 19:
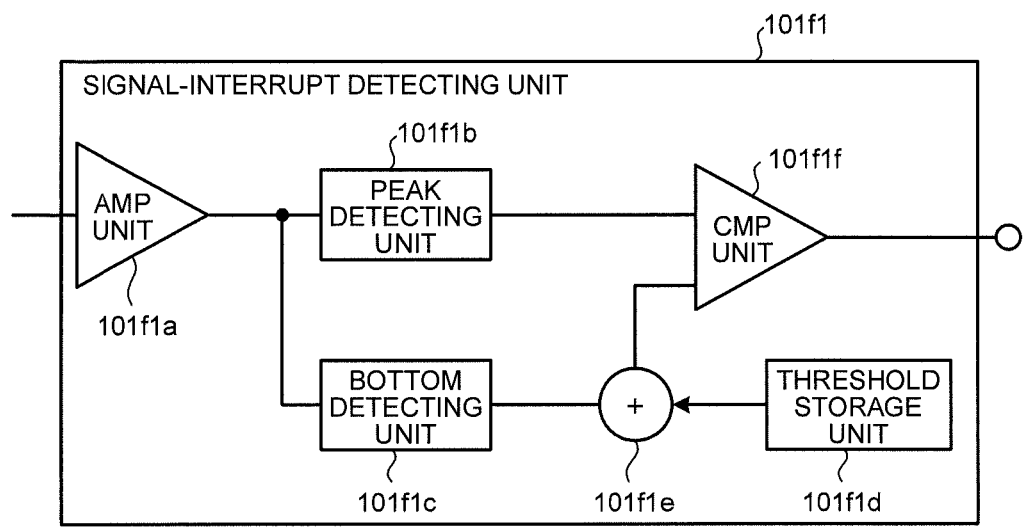
FIG. 19 is a diagram that illustrates an explanatory circuit of a signal-interrupt detecting unit.

FIG. 19 is a diagram that illustrates an explanatory circuit of the signal-interrupt detecting unit 101*f*1. The signal-interrupt detecting unit 101*f*1 includes an AMP unit 101*f*1*a* that is a preamplifier and amplifies an input signal; a peak detecting unit 101*f*1*b* that detects the peak of the output from the AMP unit 101*f*1*a*; and a bottom detecting unit 101*f*1*c* that detects the bottom of the output from the AMP unit 101*f*1*a*.

The signal-interrupt detecting unit 101*f*1 further includes a threshold storage unit 101*f*1*d* that stores a voltage threshold for discriminating between H (on) and L (off) of a signal; and a CMP unit 101*f*1*f* that is a comparator and compares the output from the peak detecting unit 101*f*1*b*, the output from the bottom detecting unit 101*f*1*c*, and the output of the threshold from the threshold storage unit 101*f*1*d*. The signal-interrupt detecting unit 101*f*1 further includes an addition unit 101*f*1*e* that adds the output from the bottom detecting unit 101*f*1*c* to the output of the threshold from the threshold storage unit 101*f*1*d*.

The CMP unit 101*f*1*f* outputs a signal indicating the presence of a packet when the output from the bottom detecting unit 101*f*1*c* is equal to or more than the threshold. The CMP unit 101*f*1*f* outputs a signal (signal-interrupt detection signal) indicating the absence of a packet when the output from the peak detecting unit 101*f*1*b* is less than the threshold.

Specifically, the signal-interrupt detecting unit 101*f*1 includes the peak detecting unit 101*f*1*b* and the bottom detecting unit 101*f*1*c* that detect the mark side and the space side, respectively, of a preamplifier output signal from the PD/TIA unit 101*b*1. When the output is more than the predetermined threshold for discriminating between the presence and absence of a packet, it is asserted indicating that a packet is present. When there are no packet signals, it is deasserted. A signal output from the signal-interrupt detecting unit 101*f*1 may be an analog signal or digital signal. Furthermore, a signal output from the signal-interrupt detecting unit 101*f*1 may be a serial signal or parallel signal.

Exemplary Circuit of PD/TIA Unit, LIM Unit, and Output Unit

Figure 20:
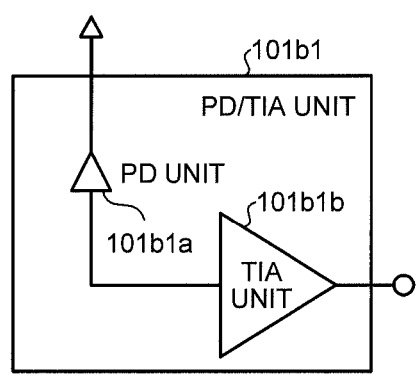
FIG. 20 is a diagram that illustrates an exemplary circuit of a PD/TIA unit.

As illustrated in FIG. 18, the optical transceiver unit 101A includes the PD/TIA unit 101*b*1, the LIM unit 101*b*2, which is a limiter amplifier, and the output unit 101*b*3. FIG. 20 is a diagram that illustrates an exemplary circuit of the PD/TIA unit 101*b*1. The PD/TIA unit 101*b*1 includes a PD unit 101*b*1*a* that is a photoelectric element that receives an optical signal and converts it into an electric signal; and a TIA unit 101*b*1*b* that amplifies the electric signal converted by the PD unit 101*b*1*a* and converts the current signal into a voltage signal.

Figure 21:
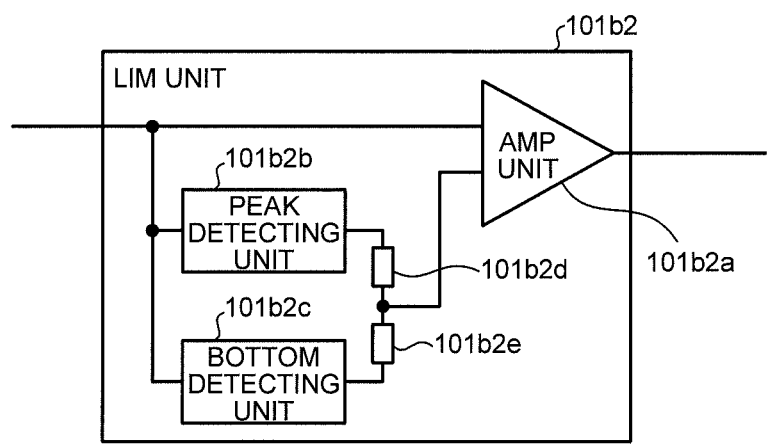
FIG. 21 is a diagram that illustrates an exemplary circuit of a LIM unit.

FIG. 21 is a diagram that illustrates an exemplary circuit of the LIM unit 101*b*2. The LIM unit 101*b*2 includes a peak detecting unit 101*b*2*b* that detects the peak of an electric signal that is finally converted into a voltage signal by the PD/TIA unit 101*b*1; a bottom detecting unit 101*b*2*c* that detects the bottom of an electric signal; a resistor 101*b*2*d* that decreases the voltage of the peak output from the peak detecting unit 101*b*2*b*; and a resistor 101*b*2*e* that decreases the voltage of the bottom output from the bottom detecting unit 101*b*2*c*. The LIM unit 101*b*2 further includes an AMP unit 101*b*2*a* that is an amplifier that receives a voltage signal input from the PD/TIA unit 101*b*1 and receives a peak voltage signal and a bottom voltage signal whose voltages have been dropped by the resistor 101*b*2*d* and the resistor 101*b*2*e*, respectively, and amplifies the signals for output.

Figure 22:
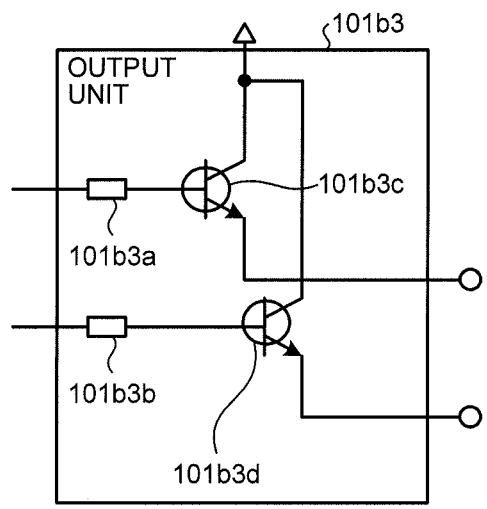
FIG. 22 is a diagram that illustrates an exemplary circuit of an output unit.

FIG. 22 is a diagram that illustrates an exemplary circuit of the output unit 101*b*3. The output unit 101*b*3 includes a resistor 101*b*3*a*, a resistor 101*b*3*b*, a transistor 101*b*3*c*, and a transistor 101*b*3*d*. The transistor 101*b*3*c* receives, as a base signal, a direct voltage signal that is output from the PD/TIA unit 101*b*1 and is directly amplified by the LIM unit 101*b*2. The transistor 101*b*3*d* receives, as a base signal, a peak voltage signal and a bottom voltage signal that are amplified by the LIM unit 101*b*2. The collector terminals of the transistor 101*b*3*c* and the transistor 101*b*3*d* are connected to each other. Thus, when there is a slight current difference between the direct voltage signal, and the peak voltage signal and the bottom voltage signal, the direct voltage signal, the peak voltage signal, and the bottom voltage signal allows output of a large current from each of the collector terminals.

Detailed Configuration of Power-saving Control Unit

Figure 23:
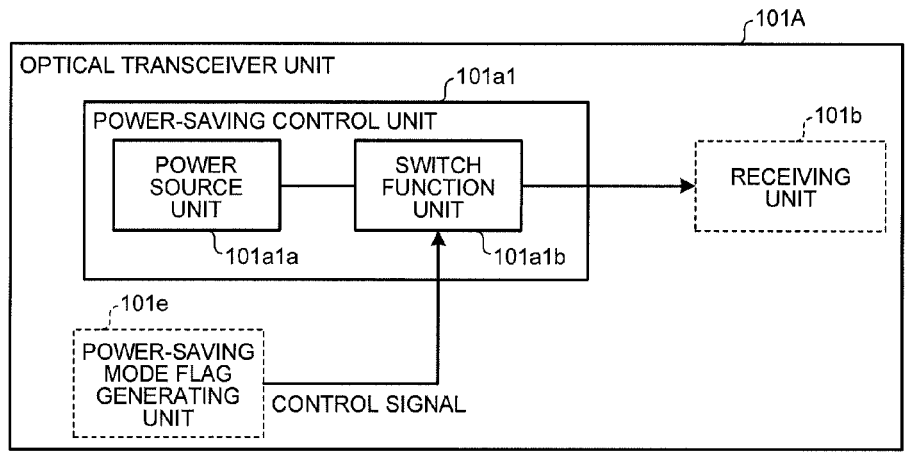
FIG. 23 is a diagram that illustrates the detailed configuration of a power-saving control unit.

FIG. 23 is a diagram that illustrates the detailed configuration of the power-saving control unit 101*a*1. The power-saving control unit 101*a*1 controls the power source of the receiving unit 101*b* so as to be turned on or off in accordance with a control signal (power-saving mode flag) that is generated and output by the power-saving mode flag generating unit 101*e*. The power-saving control unit 101*a*1 includes a power source unit 101*a*1*a* and a switch function unit 101*a*1*b*. The power source unit 101*a*1*a* is a power source that supplies power to the receiving unit 101*b*. The switch function unit 101*a*1*b* switches on/off the power supplied from the power source unit 101*a*1*a*. The power source may not be turned on/off for all of the functional blocks of the receiving unit 101*b* and may be turned on/off for a specific functional block.

Example of Application of Discussed Technology

Figure 24:
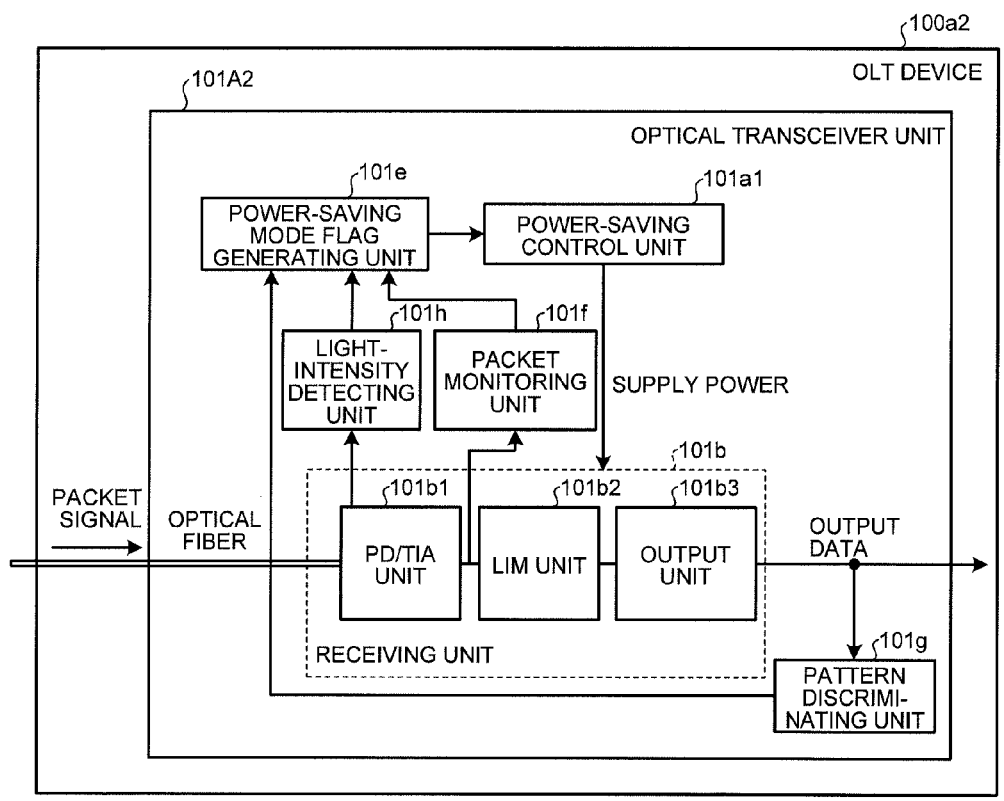
FIG. 24 is a block diagram that illustrates the configuration of an OLT device in an example of an application.

FIG. 24 is a block diagram that illustrates the configuration of an OLT device 100*a*2 in an example of an application of the discussed technology. In the example of the application, a light-intensity detecting unit 101*h* is used instead of the reset signal from the MAC unit 102 in the embodiment.

Figure 25:
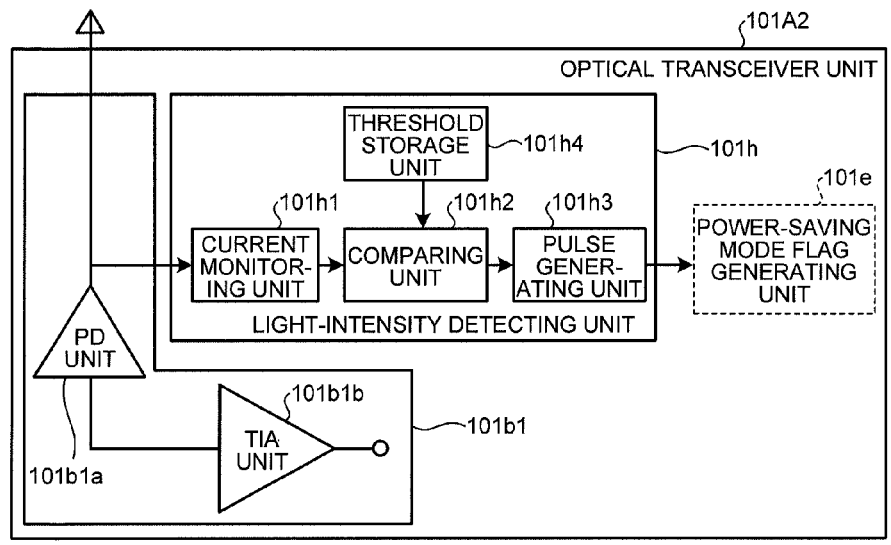
FIG. 25 is a block diagram that illustrates the detailed configuration of a light-intensity detecting unit in an example of an application.

Detailed Configuration of Light-intensity Detecting Unit in Example of Application of Discussed Technology FIG. 25 is a block diagram that illustrates the detailed configuration of the light-intensity detecting unit in the example of the application of the discussed technology. The light-intensity detecting unit 101*h* includes a current monitoring unit 101*h*1, a comparing unit 101*h*2, a pulse generating unit 101*h*3, and a threshold storage unit 101*h*4.

The current monitoring unit 101*h*1 detects an Avalanche Photo Diode (APD) current value. The current value of the APD current increases in accordance with the light intensity. The comparing unit 101*h*2 compares the APD current value with the predetermined threshold that is stored in the threshold storage unit 101*h*4. As a result of the comparison, when the APD current value is more than the threshold, it is asserted, and a pulse is generated and output by the pulse generating unit 101*h*3. The pulse is a signal input to the latch unit 101*e*1 in the power-saving mode flag generating unit 101*e*. By using this example of the application, the discussed technology may be used even in a system that may not obtain a reset signal from the MAC unit 102.

Figure 26:
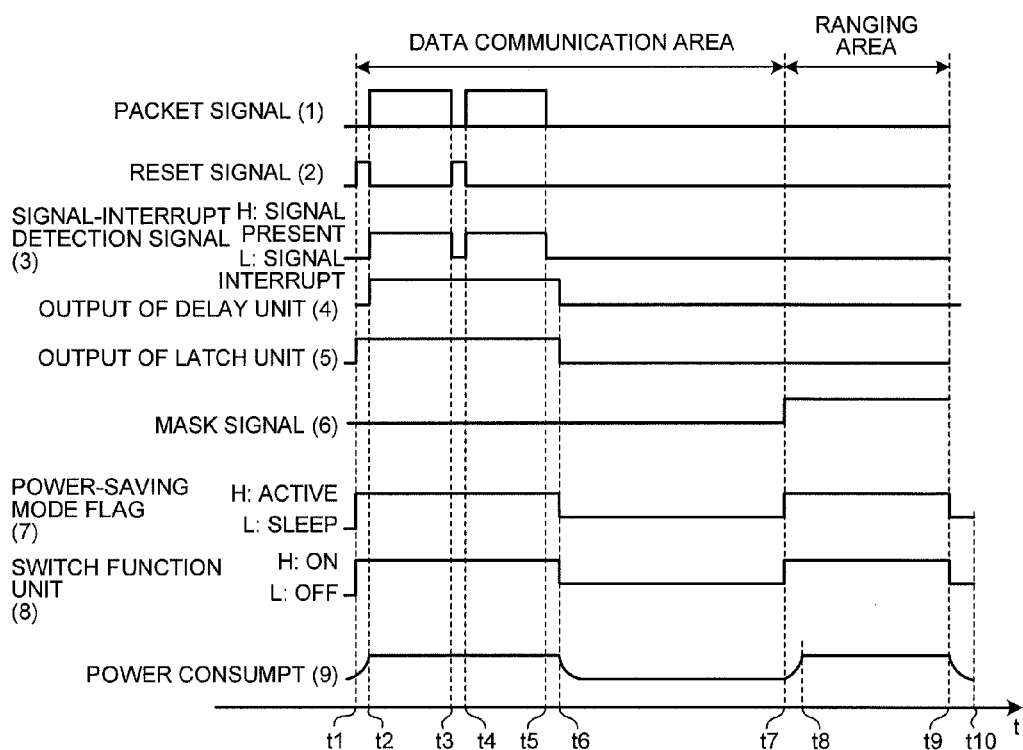
FIG. 26 is a timing chart that illustrates a power-saving control process according to the embodiment and the example of the application.

Timing chart that illustrates Power-saving Control Process according to the Embodiment and Example of Application FIG. 26 is a timing chart that illustrates a power-saving control process according to the embodiment and the example of the application. The horizontal axis denotes the time axis of one delay measurement frame. The delay measurement frame is divided into a data communication area and a ranging area.

In FIG. 26, (1) indicates a packet signal that is transmitted from the ONT device 200*ai* to the OLT device 100. (2) indicates a reset signal (or an APD current value). The resent signal is input just before each packet. (3) indicates the output from the signal-interrupt detecting unit 101*f*1. (3) is asserted in accordance with an input signal of (1) when it is more than a predetermined threshold for discriminating between the presence and absence of a packet. When there are no packet signals, it is deasserted.

(4) indicates an output signal from the delay unit 101*e*5. The falling edge of the output signal of (3) is delayed for a certain period of time (approximately a guard time). (5) indicates output from the latch unit 101*e*1. When the rising edge of the reset signal of (2) is detected, latching is performed. When the falling edge of the output signal from the delay unit 101*e*5 of (4) is detected, the latching is canceled.

(6) indicates an output signal from the mask-signal generating unit 101*e*4. The output signal is set to "H" only for the ranging area within the delay measurement frame and is set to "L" for areas other than the ranging area. (7) indicates an output signal of the power-saving mode flag. (7) is a logical addition of the signals of (5) and (6). (8) is a timing chart of the output from the switch function unit 101*a*1*b* in the power-saving control unit 101*a*1. The timing of (8) is the same as that of the signal of the power-saving mode flag of (7).

(9) indicates the power consumption of the OLT device 100*a* and the OLT device 100*a*2. When the switch function unit 101*a*1*b* of (8) is switched off, the power source of the blocks of the receiving unit 101*b* is turned off, which results in a reduction of power consumption. Specifically, in the data communication area, the power consumption may be reduced depending on the presence or absence of a packet. In the ranging area, the power-saving mode flag is always set to "H"; therefore, the switch of the switch function unit 101*a*1*b* is always switched on.

As described above, in the embodiment and the example of the application, a power saving method may be used by which it is possible to follow an increase and decrease in the number of packets in real time in accordance with an increase and decrease in the number of ONT devices 200*ai* in the PON system and which may be applied to the time during ranging that is specific to the PON system. Furthermore, because the power may be saved, it is possible to reduce the amount of heat and to improve the degree of integration of the OLT device, i.e., to improve the number of ONT devices 200*ai* contained in the OLT device 100*a* and the OLT device 100*a*2. In other words, it is possible to control, in real time, the power source of the circuit blocks of the OLT device 100*a* and the OLT device 100*a*2 in accordance with the state of an optical communication network.

The embodiment and the example of the application may be widely applied to an OLT device, which is a slave terminating device, in a communication network that performs delay time measurement, which is called ranging, or that uses a delay-time measurement method that is based on the same technical idea as "ranging" so as to measure the delay time of packet transmission and reception performed between the slave terminating device and an ONT device, which is a master terminating device.

The above is an explanation of the embodiment according to the discussed technology. The discussed technology is not limited to the embodiment and may be implemented in various different embodiments within the scope of the technical idea described in the claims. The advantages are not limited to those described in the embodiments.

Among the processes described in the embodiments, all or part of the processes that are automatically performed as described above may be performed manually. All or part of the processes that are manually performed as described above may be automatically performed by using a well-known method. Furthermore, operating procedures, control procedures, specific names, and various types of information including data and parameters as described in the above embodiment may be optionally changed except as otherwise noted.

Each of the components of the devices illustrated in the drawings is based on a functional concept and does not necessarily need to be physically configured as illustrated in the drawings. That is, specific forms of separation and integration of each of the devices are not limited to the ones illustrated in the drawings, and all or some of the devices may be configured by being functionally or physically separated or integrated in an arbitrary unit depending on various loads or usage.

According to the discussed technology, in an optical communication system that measures the delay time of a packet transmitted and received between a master terminating device and a slave terminating device, the power source of the master terminating device is always on when the delay time is measured, and, except when the delay time is measured, the power source of the master terminating device may be controlled so as to be turned on/off in accordance with the presence or absence of a packet transmitted or received. Thus, power may be saved, the amount of heat may be reduced, and the degree of integration of the master terminating device may be improved.

The above terms such as the packet monitoring unit, the power-saving mode flag generating unit, the power-saving control unit, the packet discriminating unit, the signal-interrupt detecting unit, the peak detecting unit, the bottom detecting unit, the threshold storage unit, and the receiving unit may be expressed in each other terms such as the packet monitor, the power-saving mode flag generator, the power-saving controller, the packet discriminator, the signal-interrupt detector, the peak detector, the bottom detector, the threshold storage, and the receiver.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it is should be understood that the various changes, substitutions, and alterations could be made hereto without departing from the spirit and scope of the invention.

What is claimed is:

1. A carrier-side optical communication device that is connected to a plurality of subscriber-side optical communication devices and that performs two-way communication with the subscriber-side optical communication devices in an optical communication system, the carrier-side optical communication device comprising:
   a packet monitor that monitors the presence or absence of a packet that is transmitted from the subscriber-side optical communication devices;
   a packet discriminator that discriminates between a delay measurement packet and a packet other than the delay measurement packet among packets transmitted from the subscriber-side optical communication devices;
   a power-saving mode flag generator that generates a power-saving mode flag for the carrier-side optical communication device in accordance with the presence or absence of the packet that is monitored by the packet monitor and a discrimination result by the packet discriminator; and
   a power-saving controller that controls saving of power of the carrier-side optical communication device in accordance with the power-saving mode flag generated by the power-saving mode flag generator, wherein
   when the packet discriminator determines that a packet transmitted from the subscriber-side optical communication devices is the delay measurement packet, the power-saving mode flag generator generates a power-saving mode flag so that the power-saving controller does not control the saving of power.

2. The carrier-side optical communication device according to claim 1, wherein the packet monitor includes a signal-interrupt detector that determines the presence or absence of a packet in accordance with the amplitude of a packet to be monitored, and, when it is determined that the packet is absent, outputs a signal-interrupt detection signal to the power-saving mode flag generator.

3. The carrier-side optical communication device according to claim 2, wherein
   the signal-interrupt detector includes:
      a detector that detects the peak and the bottom of the amplitude of the packet to be monitored; and
      a threshold storage that stores a threshold for determining a signal of the packet to be monitored, wherein
      when the peak of the amplitude is less than the threshold, the signal-interrupt detector determines that the packet is absent and outputs the signal-interrupt detection signal to the power-saving mode flag generator.

4. The carrier-side optical communication device according to claim 1, wherein the power-saving mode flag generator generates the power-saving mode flag in accordance with the signal-interrupt detection signal that is output from the packet monitor and in accordance with an initialization signal that is externally input to initialize a receiver of the carrier-side optical communication device that receives the packet.

5. The carrier-side optical communication device according to claim 1, further comprising a light-intensity detector that detects a current signal that corresponds to an optical signal of the packet that is transmitted from the subscriber-side optical communication devices, wherein
   the power-saving mode flag generator generates the power-saving mode flag in accordance with the signal-interrupt detection signal that is output from the packet monitor and in accordance with the current signal detected by the light-intensity detector.

6. A power-saving control method performed by a carrier-side optical communication device that is connected to a plurality of subscriber-side optical communication devices and that performs two-way communication with the subscriber-side optical communication devices in an optical communication system, the power-saving control method comprising:
   monitoring the presence or absence of a packet that is transmitted from the subscriber-side optical communication devices;
   discriminating between a delay measurement packet and a packet other than the delay measurement packet among packets transmitted from the subscriber-side optical communication devices;
   generating a power-saving mode flag for the carrier-side optical communication device in accordance with the presence or absence of the packet that is monitored at the monitoring and a discrimination result at the discriminating; and
   controlling saving of power of the carrier-side optical communication device in accordance with the power-saving mode flag generated at the generating, wherein
   the generating includes generating a power-saving mode flag by which power-saving control is not performed at the controlling, when it is determined at the discriminating that a packet transmitted from the subscriber-side optical communication devices is the delay measurement packet.

7. The power-saving control method according to claim 6, wherein the monitoring includes determining the presence or absence of a packet in accordance with the amplitude of a packet to be monitored, and, when it is determined that the packet is absent, outputting a signal-interrupt detection signal for the generating.

8. The power-saving control method according to claim 7, wherein
   the determining includes:
      detecting the peak and the bottom of the amplitude of the packet to be monitored; and
      storing a threshold for determining a signal of the packet to be monitored, wherein
      when the peak of the amplitude is less than the threshold and it is determined that the packet is absent, outputting the signal-interrupt detection signal for the generating.

9. The power-saving control method according to claim 6, wherein the generating includes generating the power-saving mode flag in accordance with the signal-interrupt detection signal that is output at the monitoring and in accordance with an initialization signal that is externally input to initialize a receiver of the carrier-side optical communication device that receives the packet.

10. The power-saving control method according to claim 6, further comprising detecting a current signal that corresponds to an optical signal of the packet that is transmitted from the subscriber-side optical communication devices, wherein
 the generating includes generating the power-saving mode flag in accordance with the signal-interrupt detection signal output at the monitoring and in accordance with the current signal detected at the detecting.

* * * * *